March 30, 1926.
G. A. MITCHELL
CAMERA ATTACHMENT
Filed August 17, 1921
1,578,842
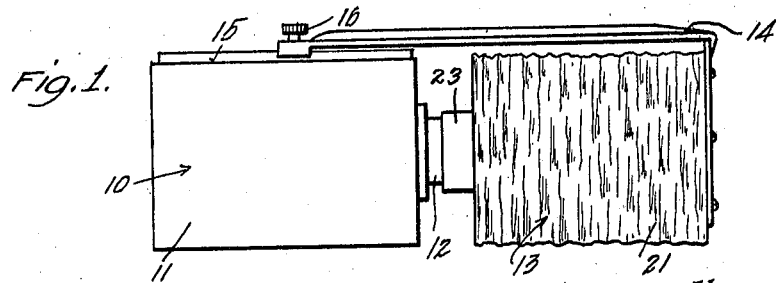
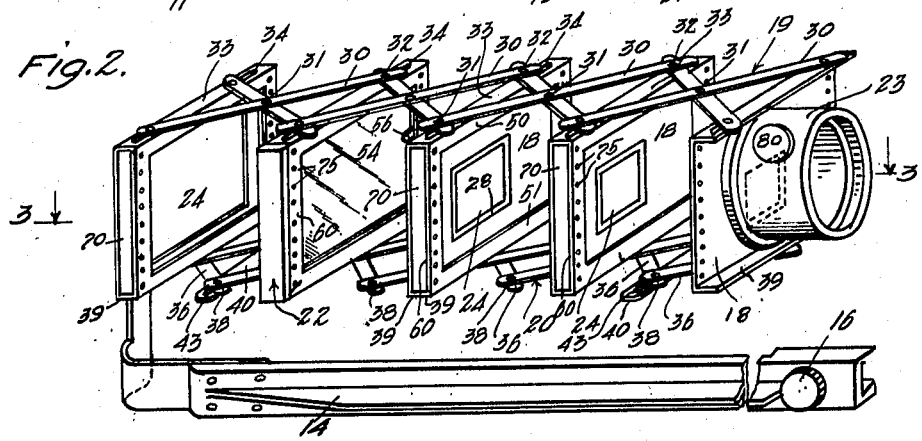
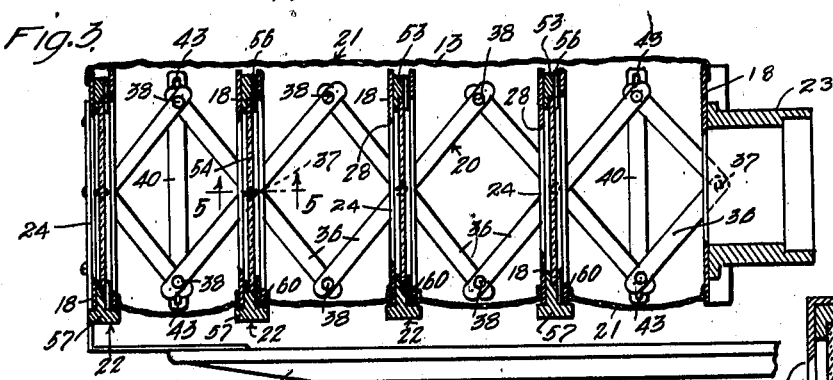
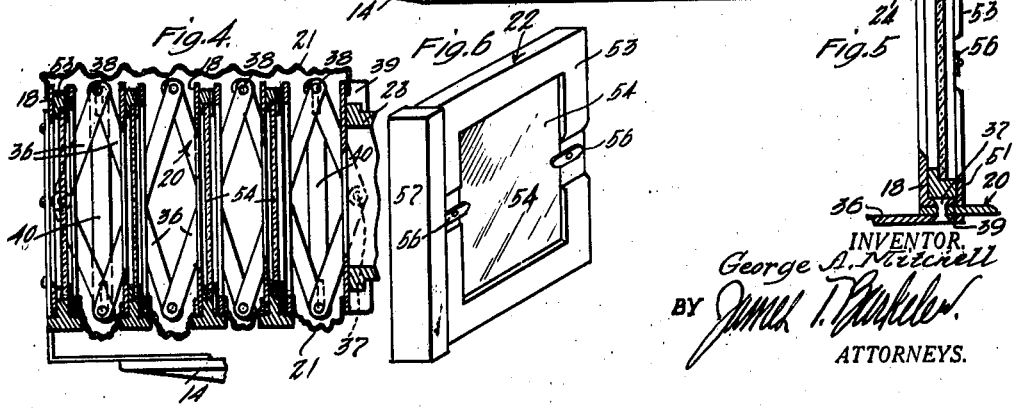
INVENTOR.
George A. Mitchell
BY
ATTORNEYS.

Patented Mar. 30, 1926.

1,578,842

UNITED STATES PATENT OFFICE.

GEORGE A. MITCHELL, OF HOLLYWOOD, CALIFORNIA, ASSIGNOR TO MITCHELL CAMERA CORPORATION, A CORPORATION OF CALIFORNIA.

CAMERA ATTACHMENT.

Application filed August 17, 1921. Serial No. 493,170.

*To all whom it may concern:*

Be it known that I, GEORGE A. MITCHELL, a citizen of the United States, residing at Hollywood, in the county of Los Angeles and State of California, have invented new and useful Improvements in Camera Attachments, of which the following is a specification.

This invention has to do with a camera attachment and it is an object of the invention to provide a device for shading the lens of a camera.

When using an ordinary camera, either a moving picture camera, or a still picture camera, a great amount of unnecessary and undesirable light falls upon the lens or lenses, as the case may be, and thus interferes more or less with the taking of good pictures. In many instances there is such an amount of this undesirable light falling upon the lenses, that it is necessary to shade them with the hand or with an object, such for instance as a hat.

It is an object of this invention to provide a device which can be used in connection with a camera to shade the lenses so that only the desired light falls upon them. By thus shading the lenses clear true pictures can be obtained.

A distinctive feature of this invention is the provision of the shade which is adjustable. The device can be very easily and quickly adjusted to accommodate lenses of different angularities, or to vary the angle, or taper, of the shaft of light it allows to fall upon the lenses. Being adjustable the device can be used on cameras equipped with various lenses or on cameras in which different lenses can be brought into operation.

Another feature of the device is the provision of means for preventing undesired light passing to the lenses even though it does enter the outer part of the device. This feature makes the device act not only to shade the lens, but also to cut off undesirable light such as would reach the lens even though it was shaded as by an object such as a hat, or the like.

Another feature of the invention is the provision of means for carrying filters, screen, etc., which may be found desirable or necessary to be arranged in the path of the light passing to the film. The preferred form of the invention provides carriers which are adapted to removably carry plates or screens and which are removable from other parts of the device for the purpose of replacing or changing plates or screens.

The various objects and features of the invention will be best and more fully understood from the following detailed description of a typical form of the invention throughout which reference is had to the accompanying drawings in which:

Fig. 1 is a plan view of a typical camera equipped with the device of the present invention. Fig. 2 is a perspective view of the frame structure of the device showing it in an opened out position and showing only one of the removable carriers in place; Fig. 3 is a horizontal transverse detail sectional view on line 3—3 of Fig. 2 showing the device in an opened out position. Fig. 4 is a view similar to Fig. 3 showing the parts in a closed position. Fig. 5 is an enlarged vertical detail sectional view taken as indicated by line 5—5 on Fig. 3, and Fig. 6 is a perspective view of one of the removable carriers.

In the drawing, numeral 10 designates a typical camera comprising a box structure 11 at the front of which is a lens carrier 12. The device 13 provided by the present invention is adjustably attached to the camera 10 to shade or protect the lens, or lenses, as the case may be, carried by the lens carrier 12. In the particular arrangement shown in the drawings the device 13 is attached to the camera 10 at the lens carrier and by means of an arm 14 which extends rearwardly from the forward part of the device to the box 11 where it is slidably carried on a guide 15 secured to the box 11. The device 13 can be adjusted by moving the arm 14 longitudinally on the guide 15 and can be set in any desired position by suitable manipulation of a set screw 16 carried by the arm 14 to engage the guide-way 15. The arm can be detached from the guide 15 at either end of said guide.

The device 13 provided by the present invention comprises, generally, a plurality or series of apertured plates 18, two extension frames 19 and 20 which carry the plates 18, a flexible opaque cover or bellows 21, a plurality of plate or screen carriers 22, and a sleeve 23 for receiving the lens carrier 12 of the camera. The plates 18 are preferably, although not necessarily, equal in size and are formed with various sized openings or apertures 24. The apertures 24 in the several plates 18 increase uniformly in size from the innermost plate, that is the plate closest the camera, to the outermost plate, as clearly illustrated in the several figures of the drawings. The aperture in the innermost plate 18 is comparatively small and in practice is usually substantially equal to the size of the exposed area of the film, while the aperture in the outermost plate is considerably larger than the exposed area of the film and in any particular case depends upon the construction of the device and the range of angularity desired or required of the device. The apertures in the several plates between the innermost and outermost plate vary, as before stated, evenly or regularly in size between that of the aperture in the innermost plate and that of the aperture in the outermost plate. In accordance with the preferred form of the invention the walls 28 of the apertures are beveled so that the apertures are larger at their inner edges than at their outer as clearly shown in Figs. 3 and 4 of the drawings. By thus beveling the walls of the apertures light from the outer end portion of the device can not fall upon them to be reflected.

The extension frames 19 and 20 carry the plates 18 in parallel spaced relation and so that their spacing can be varied or adjusted. The frames 19 and 20 preferably support the plates equal distances apart, that is, so that the several spaces are equal and vary equally when the device is adjusted. The frame 19 is of lazy-tongs formation in that it comprises several connected pairs of crossed levers 30. The levers 30 of each pair are pivotally connected at their centers by pivot pins 31 and the adjacent ends of the levers of adjacent pairs are pivotally connected by pivot pins 32. The connection between the frame 19 and the plates 18 is effected by the pivot pins 32 being connected to flanges 33, extending from the plates 18, by extending through suitable slots 34 formed in said flanges. From inspection of the drawings, particularly of Fig. 2 of the drawings, it will be clearly understood how the frame 19 is connected with the plates 18 and it will be obvious how the slots 34 in the flanges 33 limit the movement or extensibility of the frame 19. For instance, the amount that the frame 19 can be collapsed is limited by the pivot pins 32 engaging the outer ends of the slots 34 and the amount that the frame 19 can be extended is limited by the pivot pins engaging the inner ends of the slots 34.

The frame 20 is similar, generally, to the frame 19 in that it comprises connected pairs of levers 36. The middle portions of the levers of each pair are connected by pivot pins 37 while the adjacent ends of levers of adjacent pairs are pivotally connected by pivot pins 38. It will be noted however, that the frame 20 is not connected to the plates 18 in the same manner as the frame 19 but that the connection between the frame 20 and the plates 18 is effected by the pivot pins 37 which connect the middle portion of the levers. The pivot pins 37 extend through bores in flanges 39 which extend from the plates 18. For the purpose of limiting the amount that the frame 20 can be collapsed and extended it is preferred that one or more links 40 be arranged between adjacent pairs of links in the manner illustrated in Figs. 2, 3, and 4 and that the pivot pins 38 connecting said pairs of links be arranged to extend through slots 43 in the links 40. The slots 43 of the links 40 act to limit the movement of the frame 20 in much the same manner as the slots 34 in the flanges 33 act to limit the movement of the frame 19. With the construction and arrangement thus described the plates 18 are held in parallel spaced relation and their spacing is adjustable. It has been found in practice that by connecting the plates 18 to one of the frames in one manner and to the other frame in another manner, as above described, that they are effectively braced in parallel spaced relation without any danger of binding due to any inequalities of movement of the two frames 19 and 20. Although I have just described the invention as being carried out by two extension frames it is to be understood that I do not limit myself to such specific construction as it will be obvious that it might well be carried out with a single extension frame of suitable construction. I have found in practice, however, that the arrangement and construction above set forth is particularly simple, effective, and inexpensive of manufacture.

In the preferred form of the invention the flanges 33 and 39 are at the upper and lower edges, respectively, of the plates 18 and they both extend in the same direction. Flanges 50 and 51 extend from the outer edges of the flanges 33 and 39, respectively, toward each other to form guide-ways for the removable plate carriers 22. The end portions of the flanges 50 and 51 of each plate 18 are connected by webs 60 which serve to brace and strengthen the various flanges, and in fact the entire plate structure, and also form with the ends of the plates and the ends of the flanges rectangular passage-ways or openings 70 for the reception of the carriers 22.

Each plate carrier 22 comprises a rectangular frame 53 adapted to be slidably carried in the guide-ways formed by the flanges on the plates 18, and is adapted to removably carry a screen or plate 54. In the particular form of carrier 22 shown in the drawings the screen or plate 54 is adapted to be removably retained in place in the frame 53 by pivoted latch members 56. At one side of the frame 53 there is an enlarged part or grip 57 by which the carrier can be conveniently gripped and which serves as an effective closure for the opening 70 through which the frame 53 is moved.

The cover 21 which is of flexible opaque material, say for instance, leather, fabric, etc., extends between the outermost and innermost plates 18 in a manner to completely cover the top of the device, the bottom of the device, one side of the device, and the other side of the device excepting for the openings 70. In practice the covering may be attached to the frame structure in any suitable manner, for instance, it may be stitched or tied to the edges of the plates 18. In the drawings I have shown openings 75 in the plates 18 and in the various parts of the frame structure for the reception of tie members by which to secure the covering to the frame structure. At the side of the device where the openings 70 are left open the covering 21 extends between the plates 18 and web 60 in the manner clearly illustrated in Figs. 3 and 4.

The sleeve 23 is preferably a cylindrical member extending from the innermost plate 18 and of such size as to slidably receive the lens carrier 12 of the camera. The sleeve is adapted to be slid over the lens carrier 12 and to be fixed or set in place thereon by a suitable set screw 80.

It is preferred, although not necessary, that the frame structure, that is the plates and their connected parts, the frames 19 and 20 and the sleeve 23, be formed of comparatively light metal, for instance aluminum or an alloy so that the device will not be heavy and in any way detrimental to the operation of the camera. Further, in accordance with the invention the entire device, and particularly the inner parts of the device, are surfaced or colored so that they will not reflect light. In practice I prefer to finish the various parts of the device in dull black.

In operation the device is mounted on a camera in the manner hereinbefore described and illustrated in Fig. 1 and is adjusted so that the shaft of light which it admits to the lenses of the camera coincides in angularity and size to the angularity and capacity of the lens. For instance, if the camera is equipped with a wide angle lens the device is adjusted to a more or less collapsed position such as is shown in Fig. 4 where the shaft of light converges rapidly or sharply toward the lens, while if the camera is equipped with a narrow angle lens the device is adjusted to an extended position such as is shown in Fig. 3 where the shaft of light is not so convergent. When in operation a plate carrier 22 is arranged in connection with each of the plates 18 equipped with a guide-way for the reception of a plate carrier so that all of the openings 70 will be closed. It will be understood, of course, that the plate carriers can be arranged in the device empty or without a plate or screen 54 in them and thus not interfere in any way with the shaft of light passing through the device to the lenses of the camera. At any time when it is desired to screen or filter the light passing to the lenses of the camera, one of the plate carriers can be withdrawn from the device and the proper plate or screen placed in it whereupon it can be re-arranged in the device. In operation the device is very effective in allowing only the desired shaft of light to fall upon the lenses as the several plates 18 effectively baffle undesired light so that practically none of it reaches the inner part of the device or the lens of the camera. In practice the device of the present invention can be easily and quickly arranged in connection with or removed from a camera by simple manipulation and operation of the set screws 16 and 80.

Having described only a preferred form of my invention I do not wish to limit myself to the details hereinabove set forth but wish to reserve to myself any changes or variations that may appear to those skilled in the art and that may fall within the scope of the following claims.

Having described a preferred form of my invention, I claim:

1. In a camera attachment of the character described, a frame structure comprising two series of pivotally connected pairs of pivotally connected levers, and a plurality of apertured plates carried by the frame structure, the plates being connected to one series of levers at the points of pivotal connection of the pairs of levers and to the other series of levers at the points of pivotal connection of the paired levers.

2. A camera shade, comprising an extensible frame composed of a plurality of interconnected extensible sections arranged to be capable of equal extension and contraction, and a plurality of apertured plates spacedly supported on the several frame sections to be moved equally to and from each other when the frame is contracted and extended, the apertures in the plates being maintained in alignment and the apertures regularly increasing in size from one end of the device to the other, each apertured plate being formed to receive a removable carrier, and a removable carrier adapted to carry a transparent plate in register with the aperture in each plate.

3. In a camera attachment of the character described, a bellows, a frame within the bellows, a plurality of apertured plates carried by the frame with their apertures in register, a removable carrier associable with each plate adapted to support a transparent member in register with the aperture in each plate, said bellows being apertured to allow the removal of said carrier therefrom, and means for closing said aperture when the carrier is within the bellows.

4. A camera shade, comprising an extensible frame composed of a plurality of frame sections constructed and arranged to extend equally with each other when the frame is extended, and proportionately at all times with the extension of the whole frame, a plurality of apertured plates mounted one on each section of the frame, whereby in the expansion of the frame the plates maintain equi-spaced relation, and the apertures in the several plates increasing regularly in size from one end of the frame to the opposite end.

In witness that I claim the foregoing I have hereunto subscribed my name this 30th day of July, 1921.

GEORGE A. MITCHELL.